United States Patent
Cao et al.

(10) Patent No.: US 9,684,852 B2
(45) Date of Patent: Jun. 20, 2017

(54) SYSTEMS AND METHODS FOR INFERRING GENDER BY FUSION OF MULTIMODAL CONTENT

(71) Applicant: INTERNATIONAL BUSINESS MACHINES CORPORATION, Armonk, NY (US)

(72) Inventors: Liangliang Cao, Amherst, MA (US); Michele Merler, New York, NY (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/226,789

(22) Filed: Aug. 2, 2016

(65) Prior Publication Data

US 2016/0379086 A1    Dec. 29, 2016

Related U.S. Application Data

(62) Division of application No. 14/754,012, filed on Jun. 29, 2015, now Pat. No. 9,471,851.

(51) Int. Cl.
G06K 9/62         (2006.01)
G06F 17/27        (2006.01)
(Continued)

(52) U.S. Cl.
CPC ......... G06K 9/628 (2013.01); G06F 17/2785 (2013.01); G06K 9/00288 (2013.01); G06K 9/00302 (2013.01); G06K 9/00362 (2013.01); G06K 9/00677 (2013.01); G06K 9/325 (2013.01); G06N 5/04 (2013.01); G06N 7/005 (2013.01); *G06K 9/6293* (2013.01)

(58) Field of Classification Search
CPC .......... G06K 9/00664; G06K 9/00718; G06K 9/00797; G06K 9/6267; G06K 9/4652; G06F 17/30265; G06F 17/30257; G06F 17/3024; G06F 17/2785; H04N 1/40062
See application file for complete search history.

(56) References Cited

U.S. PATENT DOCUMENTS 9,058,515 B1 *   6/2015  Amtrup ................. H04N 1/387
9,471,851 B1 * 10/2016  Cao ..................... G06F 17/2785
(Continued)

OTHER PUBLICATIONS

List of IBM Patents or Patent Applications Treated as Related dated Aug. 2, 2016, 2 pages.
(Continued)

*Primary Examiner* — Amir Alavi
(74) *Attorney, Agent, or Firm* — Tutunjian & Bitetto, P.C.; Alexa Ashworth

(57) ABSTRACT

A method and systems are provided. A system includes a set of visual and textual classifiers for recognizing semantic concepts in a set of images and assigning semantic scores for the images to predict a gender of a user, and performing gender prediction from visual content and textual content in the images to respectively generate visual-based gender predictions and textual-based gender predictions. The system further includes a multimodal information fusion device for combining, using multimodal information fusion, the visual-based gender predictions, the textual-based gender predictions, and the semantic scores to infer a gender of a user.

11 Claims, 8 Drawing Sheets

(51) Int. Cl.
*G06K 9/00* (2006.01)
*G06K 9/32* (2006.01)
*G06N 5/04* (2006.01)
*G06N 7/00* (2006.01)

(56) References Cited

U.S. PATENT DOCUMENTS

| | | | | |
|---|---|---|---|---|
| 2005/0108001 | A1* | 5/2005 | Aarskog | G06F 17/271 |
| | | | | 704/10 |
| 2007/0239433 | A1* | 10/2007 | Chaski | G06F 17/27 |
| | | | | 704/9 |
| 2007/0244703 | A1* | 10/2007 | Adams, Jr. | G09B 19/04 |
| | | | | 704/270.1 |
| 2014/0279722 | A1 | 9/2014 | Singh et al. | |
| 2014/0358942 | A1 | 12/2014 | Ramesh | |
| 2014/0372358 | A1 | 12/2014 | Zhou et al. | |
| 2015/0081277 | A1* | 3/2015 | Behi | G06F 17/2705 |
| | | | | 704/9 |
| 2016/0162582 | A1* | 6/2016 | Chatterjee | G06F 17/30867 |
| | | | | 707/706 |

OTHER PUBLICATIONS

Alowibdi, et al. "Language Independent Gender Classification on Twitter", IEEE/ACM International Conference on Advances in Social Networks Analysis and Mining, Aug. 2013, pp. 739-743.

Borth, et al., "Large-scale Visual Sentiment Ontology and Detectors Using Adjective Noun Pairs", International Conference on Multimedia Mining, Oct. 2013, 10 pages.

Burger, et al. "Discriminating Gender on Twitter", Proceedings of the 2011 Conference on Empirical Methods in Natural Language Processing, Jul. 2011, pp. 1301-1309.

Chang, et el. "Specialization, Homophily, and Gender in a Social Curation Site: Findings from Pinterest", CSCW'14, Feb. 2014, 13 pages.

Ito, et al., "What is he/she like?: Estimating Twitter User Attributes from Contents and Social Neighbors", 2013 IEEE/ACM International Conference on Advances in Social Networks Analysis and Mining, Aug. 2013, pp. 1448-1450.

Kokkos, et al., "A Robust Gender Inference Model for Online Social Networks and its Application to LinkedIn & Twitter", First Monday, Peer-Reviewed Journal on the Internet, vol. 19, No. 9, Sep. 2014, 34 Pages.

Liu, et al., "What's in a Name? Using First Names as Features for Gender Inference in Twitter", Association for the Advancement of Artificial Intelligence, Mar. 2013, pp. 10-16.

Ma., "Gender Estimation for SNS User Profiling Using Automatic Image Annotation", Multimedia and Expo Workshops (ICMEW), 2014 IEEE International Conference, Jul. 2014, 6 pages.

Merler, et al., "You Are What You Tweet . . . Pic! Gender Prediction Based on Semantic Analysis of Social Media Images", International Conference on Multimedia, Jun. 2015, 6 Pages.

Nguyen, et al. "Why Gender and Age Prediction from Tweets is Hard: Lessons from a Crowdsourcing Experiment", Proceedings of COLING 2014, the 25th International Conference on Computational Linguistics: Technical Papers, Aug. 2014, pp. 1950-1961.

Pennacchiotti, et al., "A Machine Learning Approach to Twitter User Classification", Proceedings of the Fifth International AAAI Conference on Weblogs and Social Media, Jul. 2011, pp. 281-288.

Sakaki, et al. "Twitter User Gender Inference Using Combined Analysis of Text and Image Processing", Proceedings of the 25th International Conference on Computational Linguistics, Aug. 2014, pp. 54-61.

Singh, et al., "Inferring Gender of a Twitter User Using Celebrities it Follows", Cornell University Library, May 2014, 5 Pages.

Using Machine Learning and NodeJS to Detect the Gender of Instagram Users, Sep. 2014, 3 Pages.

* cited by examiner

US 9,684,852 B2

SYSTEMS AND METHODS FOR INFERRING GENDER BY FUSION OF MULTIMODAL CONTENT

This application is a divisional of Ser. No. 14/754,012 filed on Jun. 29, 2015, now U.S. Pat. No. 9,471,851.

BACKGROUND

Technical Field

The present invention relates generally to information processing and, in particular, to systems and methods for inferring gender by fusion of multimodal content.

Description of the Related Art

Obtaining gender information of users (e.g., in social media) can be very useful for marketing purposes (e.g., user segmentation, targeted advertising, and so forth). Current approaches rely on the following: (1) text analysis, which is limited by a specific language model and reaches a performance ceiling by using only one source of information; (2) social graphs, which are complementary to textual information, but offer limited gender prediction accuracy; and (3) visual information, but only from profile picture face analysis, which is not always available and/or reliable, or profile colors, which offer very limited gender prediction accuracy. The semantic information of non-face showing profile pictures and images/videos in a user's collection has not been appropriately employed yet. Furthermore the combination of multimodal (namely visual and non-visual) cues for gender estimation has largely been ignored or has been performed in a trivial, suboptimal manner. Thus, there is a need for a system that derives user gender using an effective multimodal combination of visual and non-visual cues.

SUMMARY

According to an aspect of the present principles, a method is provided. The method includes recognizing semantic concepts in a set of images and assigning semantic scores for the images to predict a gender of a user. The method further includes performing gender prediction from visual content and textual content in the images to respectively generate visual-based gender predictions and textual-based gender predictions. The method also includes combining, using multimodal information fusion, the visual-based gender predictions, the textual-based gender predictions, and the semantic scores, to infer a gender of a user.

According to another aspect of the present principles, a system is provided. The system includes a set of visual and textual classifiers for recognizing semantic concepts in a set of images and assigning semantic scores for the images to predict a gender of a user, and performing gender prediction from visual content and textual content in the images to respectively generate visual-based gender predictions and textual-based gender predictions. The system further includes a multimodal information fusion device for combining, using multimodal information fusion, the visual-based gender predictions, the textual-based gender predictions, and the semantic scores to infer a gender of a user.

According to yet another aspect of the present principles, a system for inferring gender is provided. The system includes a set of visual classifiers, each for recognizing visual content from a set of images associated with a user, assigning respective visual-based prediction confidence scores for each of the images based the recognized visual-based content, and at least one for generating a visual-based gender prediction of the user based on the respective visual-based prediction confidence scores for each of the images. The system further includes a set of textual classifiers, each for recognizing textual content from the set of images, assigning respective textual-based prediction confidence scores for each of the images based the recognized textual content, and at least one for generating a visual-based gender prediction of the user based on the respective visual-based prediction confidence scores for each of the images. The system additionally includes a multimodal information fusion device for inferring a gender of a user selectively from the visual-based gender predictions, the textual-based gender predictions, the visual-based prediction confidence scores and the textual-based prediction confidence scores.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to systems and methods for inferring gender by fusion of multimodal content.

In an embodiment, the present principles advantageously provide an inferred correlation between a user's gender and automatically recognized semantics of his/her image/video collection. In an embodiment, the present principles employ a novel filtered fusion to effectively combine complementary sources of information (visual and textual) with the aim of inferring user gender. As used herein, visual information, visual content and visual-based interchangeably refer to non-textual objects (e.g., cars, purses, etc.) that appear in images, while textual information, textual content, and textual-based refer to textual (e.g., words, phrases, names, etc.) objects that appear in images. It is to be appreciated that as used herein, the term "image" encompasses still images and videos, as the latter includes a series of images.

In an embodiment, the present principles look at the content of a user profile (from social media or other sources) and infer gender by: (1) analyzing visual information (profile picture, header picture, collection of images/videos, color, and so forth) by applying a set of pre-trained visual classifiers that can recognize semantic concepts in images and videos with a confidence score, and then learning a gender classifier; (2) analyzing textual information (text, description, name, and so forth) and providing a prediction for each source of information based on the response of a set of pre-trained textual classifiers; and (3) performing a filtered fusion of different prediction channels to produce a final prediction score. The semantic concepts capable of being recognized by the visual classifiers are pervasive and can include, but are not limited to, scenes (nature, sky, urban, gym), events (sports, entertainment), living entities (people, animals), type (animation, black-and-white), and so forth.

Figure 1:
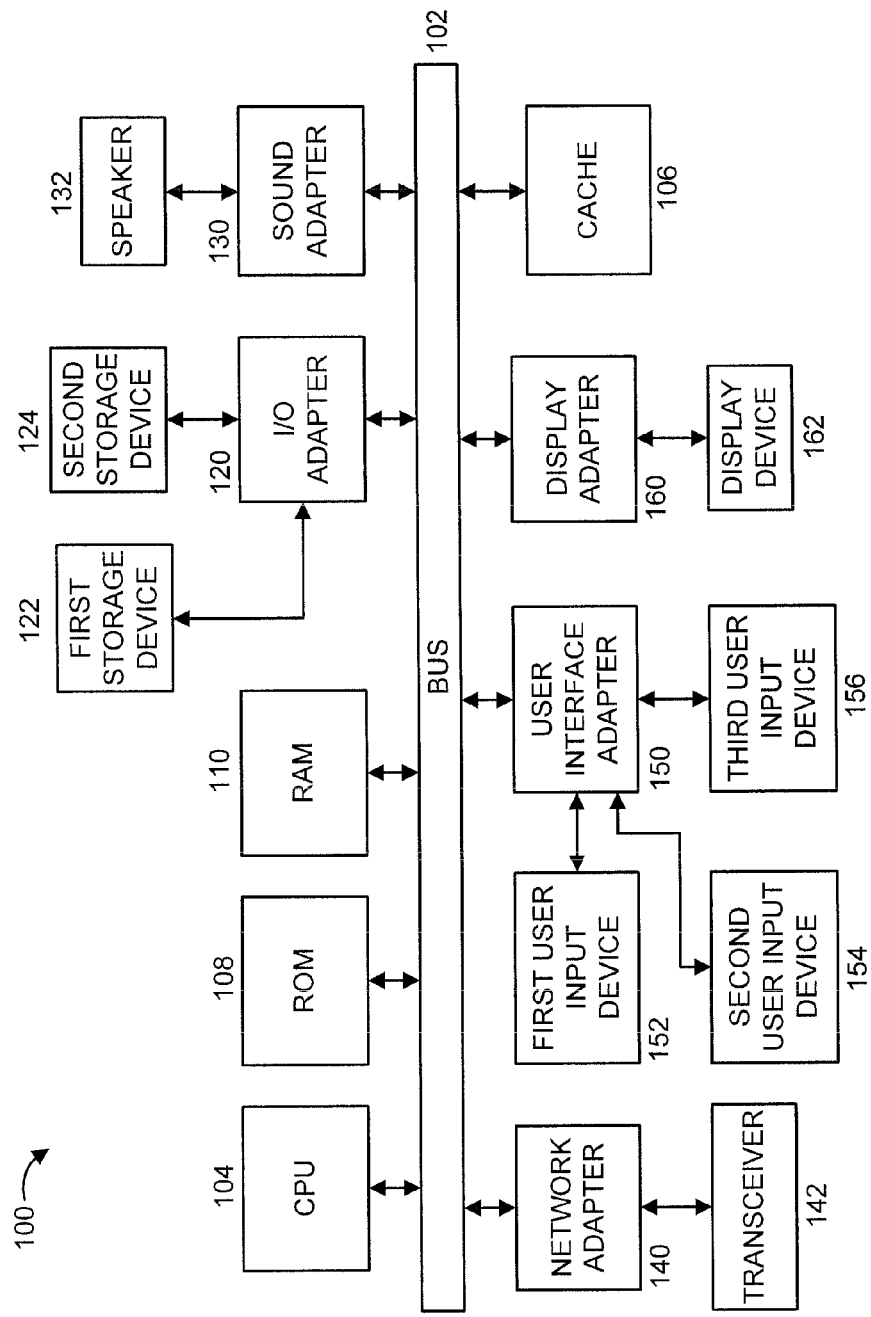
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
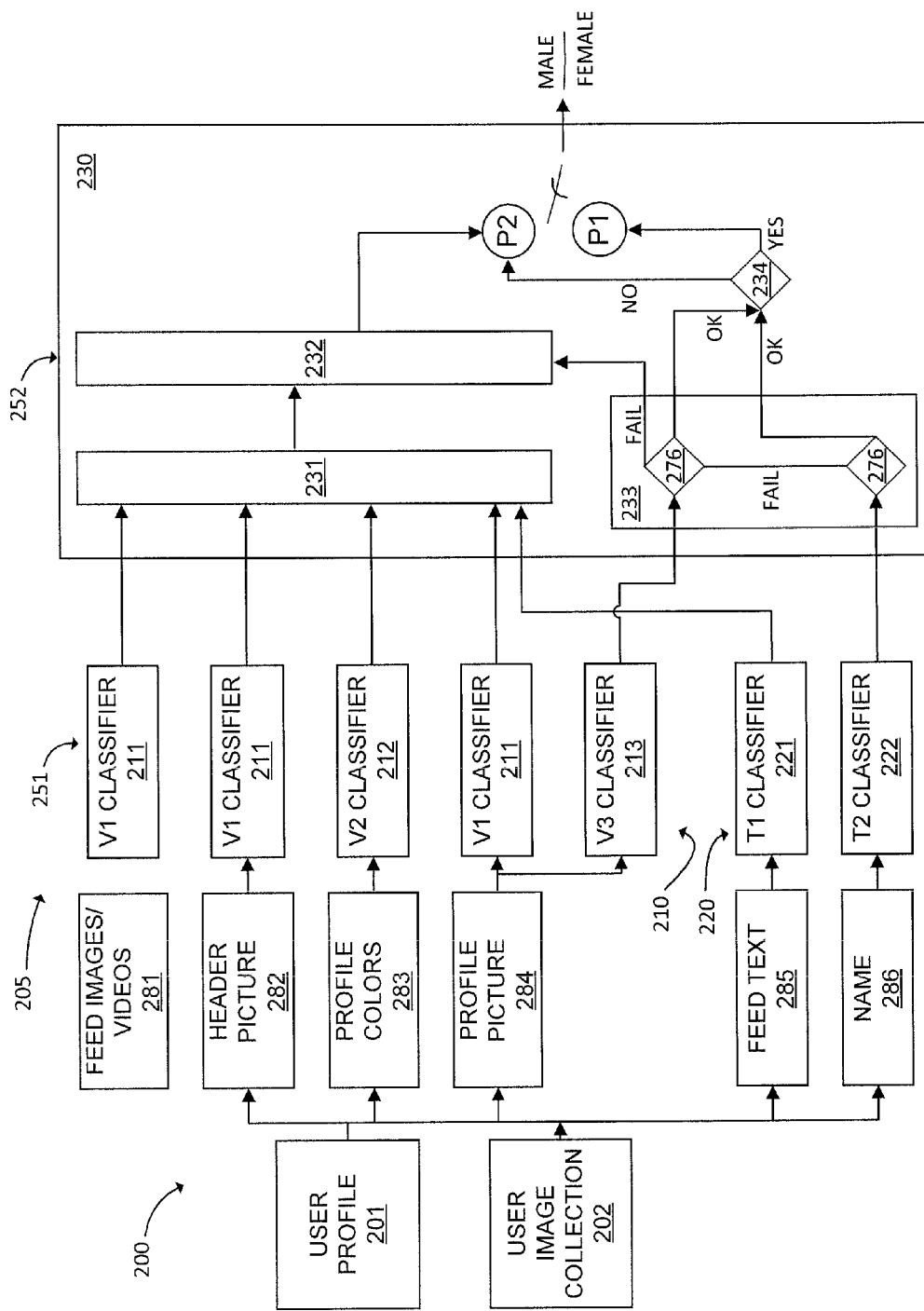
FIG. 2 shows an exemplary system 200 for inferring gender by fusion of multi-modal content, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 4:
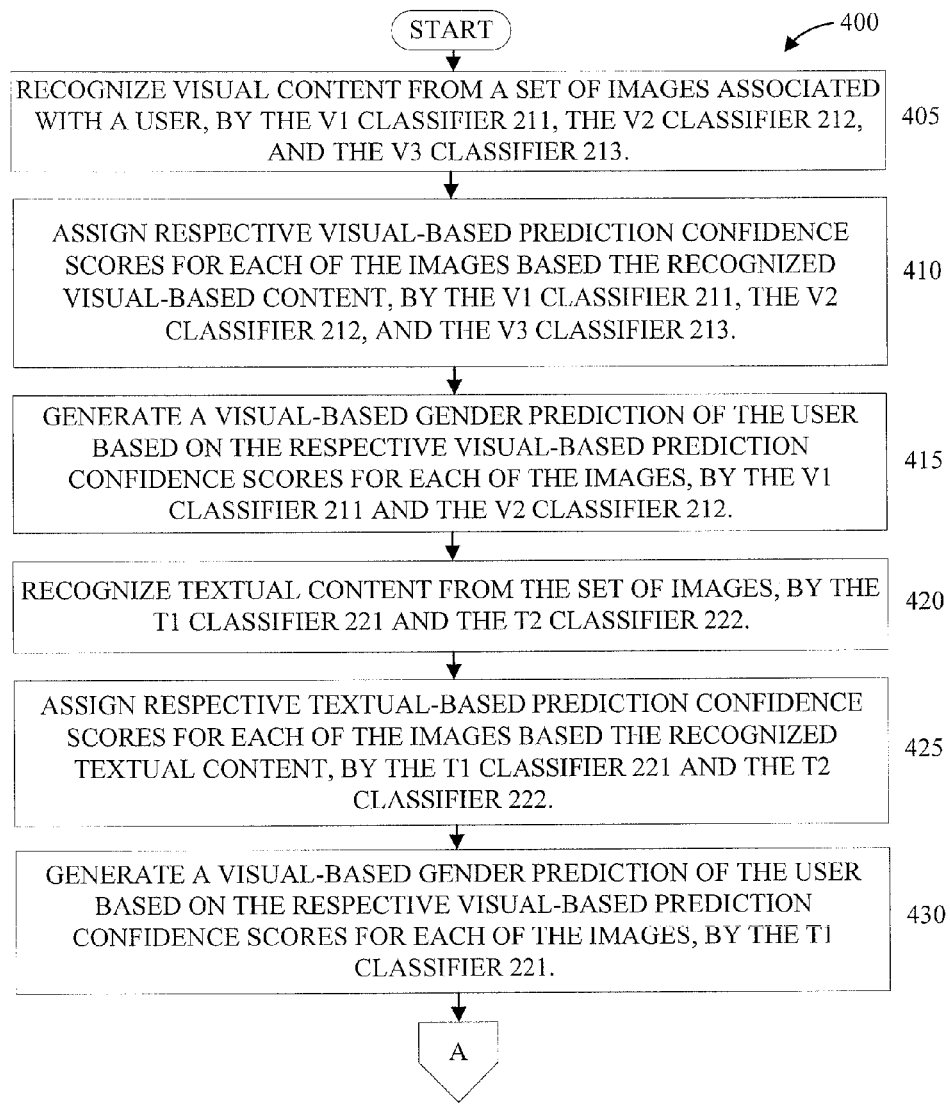
FIGS. 4-5 show an exemplary method 400 for inferring gender by fusion of multi-modal content, in accordance with an embodiment of the present principles.
Figure 5:
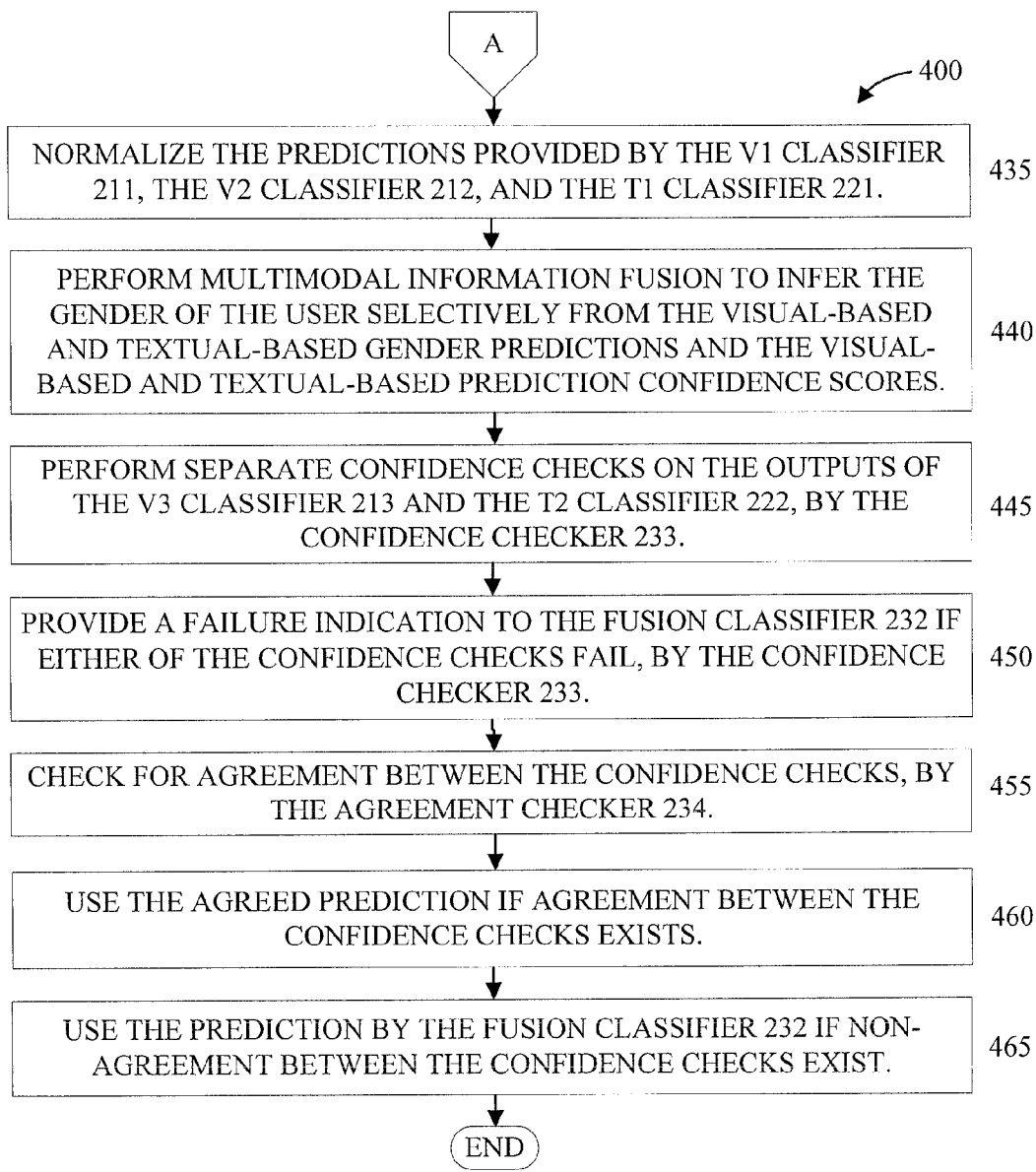

Further, it is to be appreciated that processing system 100 may perform at least part of the method described herein including, for example, at least part of method 400 of FIGS. 4-5. Similarly, part or all of system 200 may be used to perform at least part of method 400 of FIGS. 4-5.

FIG. 2 shows an exemplary system 200 for inferring gender by fusion of multi-modal content, in accordance with an embodiment of the present principles.

In the embodiment of FIG. 2, the present principles are utilized with respect to a user profile 201 for a user and a collection of images 202 associated with the user (wherein, as noted above, images can include still images and video). The user profile 201 can be, for example, on a social media website and/or can be included in the collection of images 202.

The system 200 includes a multiple classifiers 205 of different types and of different levels and a multimodal information fusion device 230.

In the embodiment of FIG. 2, the multiple classifiers 205 include first level gender classifiers 251 and a second level gender classifier 252.

The first level gender classifiers 251 include visual semantic classifiers (hereinafter "visual classifiers") 210 and textual classifiers 220.

The visual classifiers 210 include a V1 classifier 211, a V2 classifier 212, and a V3 classifier 213. The V1 classifier 211 performs gender classification based on generic visual classifiers. The V2 classifier 212 performs gender classification based on face gender analysis. The V3 classifier 213 performs gender classification based on low level descriptors.

The textual classifiers 220 include a T1 classifier 221 and a T2 classifier 222. The T1 classifier 221 performs gender classification based on name/gender frequency analysis. The T2 classifier 222 performs gender classification based on standard text bag-of-words (BOW), n-gram classifier.

The second level gender classifier 252 is implemented in the multimodal information fusion device 230 that includes a normalizer 231, a multimodal fusion classifier 232, a confidence checker 233, and an agreement checker 234. Thus, the second level gender classifier 252 includes the fusion classifier 232.

As shown in FIG. 2, from the user profile 201, visual information is extracted and provided to the appropriate classifier. For example, feed images/videos 281 and a header picture 282 are provided to the V1 classifier 211. Profile colors 283 are provided to the V2 classifier 212. A profile picture 284 is provided to both the V1 classifier 211 and the V3 classifier 213.

In an embodiment, some of the visual classifiers 210 (here, V1 classifier 211 and V2 classifier 212) analyze the user profile 201 and the collection of images 202 to (1) identify respective gender specific visual content therein along with respective visual-based prediction confidence scores, and (2) generate a visual-based gender prediction based on the respective visual-based prediction confidence scores. Thus, a particular visual-based prediction confidence score represents an amount of confidence in a corresponding prediction that a particular gender specific visual content (e.g., a visual depiction of a motorcycle, a pocketbook, etc.) is present in a particular one of the images.

In an embodiment, some of the visual classifiers 210 (here, V1 classifier 211 and V2 classifier 212) determine respective semantic distributions from the respective visual-based prediction confidence scores for each of the images. In an embodiment, an aggregation operation is performed on the respective semantic distributions determined from these visual classifiers to obtain a respective feature vector with the number of elements equal to the number of different contents identified by these visual classifiers. For example, if V1 classifier 211 identifies 10 different types of gender specific visual content, then the feature vector will have 10 elements. Each element corresponds to the result of the aggregation operation such that, for example, the first element is the average (or other type of aggregation result, such as maximum, etc.) of all the prediction scores determined for one particular type of gender specific visual content, the second element is the average (or other type of aggregation result, such as maximum, etc.) of all the prediction scores determined for another particular type of gender specific visual content, and so on.

In an embodiment, at least some of the classifiers (V1 classifier 211 and V2 classifier 212) then generate a visual-based gender prediction for the user from the respective semantic distributions. For example, in an embodiment, V1 classifier 211 and V2 classifier 212 learn how to distinguish males from females by evaluating the feature (distribution) vectors of some (known) male users and some (known) female users.

Also as shown in FIG. 2, from the user profile 201, textual information is extracted and provided to the appropriate classifier. For example, feed text (e.g., description and 200 tweets) 285 is provided to the T1 classifier 221. A (person's) name 286 is provided to the T2 classifier 222.

In an embodiment, the textual classifiers 220 analyze the user profile 201 and the collection of images 202 to identify respective gender specific textual content therein with respective textual prediction confidence scores.

In an embodiment, T1 classifier 221 analyzes the user profile 201 and the collection of images 202 to (1) identify respective gender specific textual content therein along with respective textual-based prediction confidence scores, and (2) generate a textual-based gender prediction based on the respective textual-based prediction confidence scores. Thus, a particular textual-based prediction confidence score represents an amount of confidence in a corresponding prediction that a particular gender specific textual content (e.g., a textual depiction such as the words motorcycle, pocketbook, etc.) is present in a particular one of the images.

In an embodiment, T1 classifier 221 determines respective semantic distributions from the respective textual-based prediction confidence scores for each of the images. In an embodiment, an aggregation operation is performed on the respective semantic distributions determined from T1 classifier 221 to obtain a feature vector with the number of elements equal to the number of different contents identified by T1 classifier 221. Each element corresponds to the result of the aggregation operation such that, for example, the first element is the average (or other type of aggregation result, such as maximum, etc.) of all the prediction scores determined for one particular type of gender specific textual content, the second element is the average (or other type of aggregation result, such as maximum, etc.) of all the prediction scores determined for another particular type of gender specific textual content, and so on.

In an embodiment, T1 classifier 221 then generates a textual-based gender prediction for the user from the respective semantic distributions. For example, in an embodiment, T1 classifier 221 learns how to distinguish males from females by evaluating the feature (distribution) vectors of some (known) male users and some (known) female users.

We now describe V3 classifier 213 and T2 classifier 222. In an embodiment, the V3 classifier 213 and T2 classifier 222 are fundamentally different from the other first level gender classifiers 251, in that they do not involve learning a machine learning model on top of some representation to derive a prediction, but involve a simple lookup operation (for an identifier name, T2 classifier 222 performs a lookup on the frequency of males and females associated with that name) or face gender lookup (the face in the profile picture is male or female). Those two types of information represent a very strong clue on someone's gender, therefore they have more accountability than the other machine learning based approaches. Therefore, we simply do a quality check on them using the confidence checker 233, rather than normalizing by the normalizer 231 (normalization is a pre-processing step performed on the different signals provided from some of the classifiers before combining them) for combining them in the multimodal fusion classifier 232. Confidence checker 233 performs a confidence check 276 on the output of the V3 classifier 213 and another confidence check 277 on the output of the T2 classifier 222.

In an embodiment, the outputs of V3 classifier 213 and T2 classifier 222 could also be normalized and go into the fusion classifier, but the gender classification accuracy would be lower.

The multimodal information fusion device 230 performs multimodal information fusion of the outputs provided from the classifiers 205. The multimodal information fusion device 230 can selectively perform any of: early fusion; late fusion; and filtered fusion.

In an embodiment, early fusion uses concatenated feature vectors obtained from different sources. The feature vectors are generated by the multiple classifiers 205.

In an embodiment, late fusion uses information pooling strategies to combine the results of separately trained classifiers. In an embodiment, late fusion can further involve training a nonlinear support vector machines (SVMs) on top of the any concatenation of prediction scores from the individual classifiers.

In an embodiment, filtered fusion involves selecting which information to use directly and which information to aggregate, in order to provide a final prediction of gender from the system.

These fusion types are also further described herein below.

It is to be appreciated that while one or more embodiments described herein involve the use of a support vector machine, the present principles can readily utilize other alternate learning/classification methods while maintaining the spirit of the present principles. Thus, the present principles are not limited to the use of SVMs for learning/classification and other types of learning/classification methods can also be used, such as, but not limited to, any of Convolutional Neural Networks (CNNs), Boosting, Random Forests, and so forth. These and other variations of the present principles are readily determined by one of ordinary skill in the art, while maintaining the spirit of the present principles.

In FIG. 2, p1 and p2 represent two different gender predictions generated by two different systems, and are utilized as follows in accordance with an embodiment of the present principles. Of course, other utilizations can also be employed given the teachings of the present principles provided herein, while maintaining the spirit of the present principles.

Regarding prediction p1, if V3 classifier 213 and T2 classifier 222 agree on a prediction (let's say male), then the whole system will use that prediction, which is p1.

Regarding prediction p2, if V3 classifier 213 and T2 classifier 222 disagree on a prediction (let's say T3 classifier 213 predicts male and T2 classifier 222 predicts female), then the whole system will use the prediction generated by the fusion classifier 232, which is p2.

Figure 3:
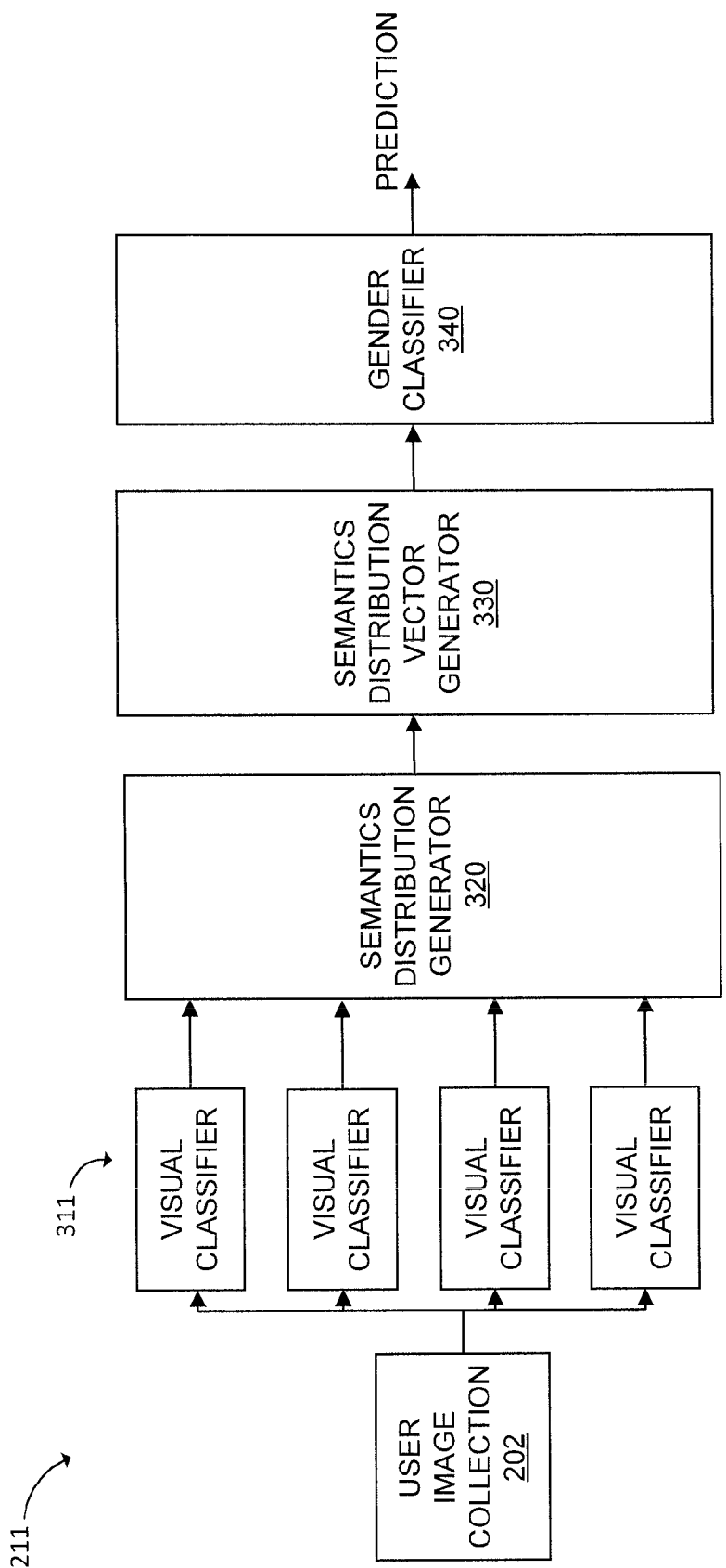
FIG. 3 further shows the V1 classifier 211 of FIG. 2, in accordance with an embodiment of the present principles.

FIG. 3 further shows the V1 classifier 211 of FIG. 2, in accordance with an embodiment of the present principles.

The V1 classifier 211 includes a set of visual classifiers 311, a semantic distribution generator 320, a semantics distribution vector generator 330, and a gender classifier 340.

The set of visual classifiers 311 analyze the collection of images 202 to recognize gender specific visual content therein along with respective visual-based prediction confidence scores.

The semantic distribution generator 320 generates a semantic distribution for each different type of gender specific visual content based on the visual-based prediction confidence scores for that type of content across all of the images.

The semantics distribution vector generator 330 generates the semantics distribution vector based on visual-based prediction confidence scores as described herein.

The gender classifier 340 generates a visual-based gender prediction based on the semantics distribution vector.

In an embodiment, the V2 classifier 212 operates in a similar manner, but using one or more facial feature visual classifiers.

FIGS. 4-5 show an exemplary method 400 for inferring gender by fusion of multi-modal content, in accordance with an embodiment of the present principles. It is to be appreciated that while textual processing is performed in method 400 subsequent to visual processing, such ordering is arbitrary, as the ordering could be switched or both performed in parallel. These and other variations of the steps of FIGS. 4-5 are readily contemplated by one of ordinary skill in the art given the teachings of the present principles provided herein, while maintaining the spirit of the present principles.

At step 405, recognize visual content from a set of images associated with a user, by the V1 classifier 211, the V2 classifier 212, and the V3 classifier 213.

At step 410, assign respective visual-based prediction confidence scores for each of the images based the recognized visual-based content, by the V1 classifier 211, the V2 classifier 212, and the V3 classifier 213. The scores can be in vector form, and/or provided as a frequency count, and/or so forth At step 415, generate a visual-based gender prediction of the user based on the respective visual-based prediction confidence scores for each of the images, by the V1 classifier 211 and the V2 classifier 212.

At step 420, recognize textual content from the set of images, by the T1 classifier 221 and the T2 classifier 222.

At step 425, assign respective textual-based prediction confidence scores for each of the images based the recognized textual content, by the T1 classifier 221 and the T2 classifier 222. The scores can be in vector form, and/or provided as a frequency count, and/or so forth At step 430, generate a visual-based gender prediction of the user based on the respective visual-based prediction confidence scores for each of the images, by the T1 classifier 221.

At step 435, normalize the predictions provided by the V1 classifier 211, the V2 classifier 212, and the T1 classifier 221.

At step 440, perform multimodal information fusion to infer the gender of the user selectively from the visual-based and textual-based gender predictions and the visual-based and textual-based prediction confidence scores.

At step 445, perform separate confidence checks on the outputs of the V3 classifier 213 and the T2 classifier 222, by the confidence checker 233.

At step 450, provide a failure indication to the fusion classifier 232 if either of the confidence checks fail, by the confidence checker 233.

At step 455, check for agreement between the confidence checks, by the agreement checker 234.

At step 460, use the agreed prediction if agreement between the confidence checks exists.

At step 465, use the prediction by the fusion classifier 232 if non-agreement between the confidence checks exist.

A description will now be given regarding face-based gender classification/prediction using the V2 classifier 212, in accordance with an embodiment of the present principles.

In an embodiment, face-based gender classification/prediction involves face detection, salient points identification, registration and attributes extraction including gender, age, facial expressions and accessories (glasses, hats, etc.). For each input image, the system returns the detected faces together with their attributes and confidence scores (e.g., in a scale from 0 to 10, 0 to 100, or any other scale values). When more than one face is detected, we can predict gender by majority voting, or by confidence score in case an equal number of male and female faces where found. Of course, other tie-breaking schemes can also be used in accordance with the teachings of the present principles, while maintaining the spirit of the present principles.

A description will now be given regarding profile picture semantics, in accordance with an embodiment of the present principles.

It is noted that even in cases where a user's face is not portrayed in his/her profile picture, the choice of subject for such picture is correlated with the user's gender. We therefore employed a set of visual classifiers to recognize the content of those images and used their predictions as a feature to estimate the user's gender. The choice of which categories to recognize in the pictures is not trivial. In an embodiment, the following 25 categories were chosen: adult; animal; baby; beach; boy; brand logo; building; CGI; car; cat; child; dog; elderly man; elderly person; elderly woman; female; adult; girl; horse; human portrait view; human; icon; male adult; motorcycle; nature; and two people. Of course, the preceding categories are merely illustrative and, thus, other categories can also be used in accordance with the teachings of the present principles. In order to qualitatively evaluate our choice of visual classifiers and determine the most discriminative ones for gender, we trained two linear support vector machines (SVMs) on top of the semantic model vector (SMV) as follows: one uses the male user profile pics as positives and the female ones as negatives; and the other one inverts the roles.

In experiments, the following information was gleaned from the weights of the SMVs: many weights confirm intuitions such as, but not limited to, for example, male adult with a large positive weight for male, and a large negative weight for female. Some are more interesting, for example male users seem to be cat lovers, while female users seem to prefer dogs. Male users post more vehicles (car and motorcycle), while female users have more profile pictures with friends (two people) and landscapes, both rural (nature) and urban (building).

A description will now be given regarding image collection analysis, in accordance with an embodiment of the present principles.

In an embodiment, we can apply the same type of semantic analysis herein above regarding the picture profile semantics to all the images in a user's feed. While the approach is similar to the profile picture analysis, in this context we are looking at a collection of multiple images. Therefore the assumption is that the distribution of categories depicted in the images posted by a user is correlated to his/her gender. In fact, for each concept $C_i$, we have not one but a set of scores $C_i(x_j)$, with $j=1, \ldots, N_k$, where N is the number of images posted by a user k.

In an embodiment, we use aggregation at the prediction level, in which we trained the gender predictor using all the semantic model vectors from all of the images in the user's feed, instead of using a single, aggregated vector for a user. We then pooled the prediction scores from the gender classifier on the images of a test user to determine his/her gender. Of course, other approaches or variations on the preceding approach can be used, while maintaining the spirit of the present principles.

A description will now be given of the use of additional visual information, in accordance with an embodiment of the present principles. The following description relates to Twitter® as the source of additional visual information. However, other sources can also be used in accordance with the teachings of the present principles, while maintaining the spirit of the present principles.

Besides the profile picture and the images posted in the feed, a Twitter® user profile includes other forms of visual information such as, for example: the background image; the header image; and profile color patterns. We therefore analyze such content as well in the gender classification context.

We also collected the profile color information for the following Twitter account details: background; text; line; sidebar fill; sidebar fill; and sidebar border. The color information for each account detail can be encoded using color quantizations in RGB space (or some other color space) or by directly employing the raw color values. The gender prediction model was built on top of such representations individually and in combination using standard SVMs with radial basis function (RBF) kernels. In the analyzed dataset, 24.21% (11.9% male and 12.31% female) of the users employed the default color options. Looking at the distributions of the 20 most used colors by male and female users, we notice a higher use of red, pink and brown shades in female users, whereas males seem to prefer a palette oriented to blue, green and grey.

A description will now be given of the use of textual information, in accordance with an embodiment of the present principles.

In order to provide a comparison with the state of the art on gender prediction in social media, we also extracted and employed textual features. The textual features provide a solid and complementary cue that should be used in combination with existing techniques.

In an embodiment, two sources of textual information are used. Of course, other sources of textual information can also be used, while maintaining the spirit of the present principles.

In an embodiment, two hundred tweets from each user are analyzed, and a linear SVM on top of extracted n-grams is learned from the text. Of course, other numbers of tweets can be used.

In an embodiment, first name analysis is used. In an embodiment, first name information was obtained from a census and each detected first name was associated from the given profiles to its frequency within the male and/or female population.

A description will now be given of the use of multimodal information fusion, in accordance with an embodiment of the present principles.

The present principles can employ any one or more of early fusion, late fusion, and filtered fusion.

In early fusion, we simply concatenate feature vectors obtained from different sources. Indexing approaches that rely on early fusion first extract unimodal features separately, for example features from visual analysis and features from textual analysis. After analysis of the various unimodal streams, the extracted features are combined into a single representation. A single gender classifier is then learned on top of such representation.

For late fusion, we utilize pooling strategies to combine separately trained classifiers, as well training a nonlinear SVM on top of the concatenation of the prediction scores from the individual classifiers. Indexing approaches that rely on late fusion first train a gender classifier for each unimodal stream independently (for example one gender classifier based on text, another gender classifier based on visual analytics). The predictions of the multiple gender classifier are then combined to provide a final gender classification. Different combination strategies can be employed to aggregate the different predictions, including pooling strategies such as choosing the maximum out of the prediction scores or computing their average, or even learn another gender classifier (for example, a nonlinear SVM) on top of the predictions.

We now describe filtered fusion. Since, in an embodiment, the information provided by first name analysis and profile picture face-based analytics is not encoded in a feature vector, but provides an immediate gender prediction, in that case we use a filtered fusion approach. In an embodiment relating to this framework, the final gender prediction decision is taken immediately and without considering the other sources of information if (1) a first name matches exactly a name that associated only with either the male or female gender, or (2) the face detector found only one single face and its gender prediction score is above 90% (or some other threshold value).

A description will now be given of the use of semantics distribution by the visual classifiers, with a corresponding example, in accordance with an embodiment of the present principles.

As used herein, "semantics distribution" refers to a statistical aggregation over the scores of generic visual classifiers over all the images in a user's collection. For example, let us consider the case where a user has 100 images in his/her collection. The system runs N visual classifiers on those 100 images to recognize N visual categories (e.g., beach, dog, person, car, etc.). Thus, we have N prediction scores for each of the 100 images (e.g., image X has a prediction score of 0.7 for beach, 0.99 for dog, 0.01 for car, etc.). For each visual category N, all the prediction scores from all the images in the collection represent its distribution over the collection. Hence, for example, the distribution of dog is made of all the dog prediction scores for all 100 images. We then perform an aggregation operation (which can be, but is not limited to, computing the average score, the maximum score, and/or any other statistical aggregations). The result of this operation is one vector with N elements, where each element corresponds to the results of the aggregation operation. Thus, for example, element 1 of the vector is the average of all the 100 dog prediction scores, element 2 of the vector is the average of all the 100 Car prediction scores, and so forth.

In the case of the V1 classifier 211, the same then learns how to distinguish male/female by looking at the distribution vectors of some male users and some female users.

Thus, for every new user we want to analyze, the steps can include: (1) scoring visual models on all his/her images to obtain visual categories predictions; (2) aggregating over the distribution of scores for each visual category to obtain a semantics distribution vector; and running the V1 classifier 211 on top of the semantics distribution vector to predict whether the user is a male or a female.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
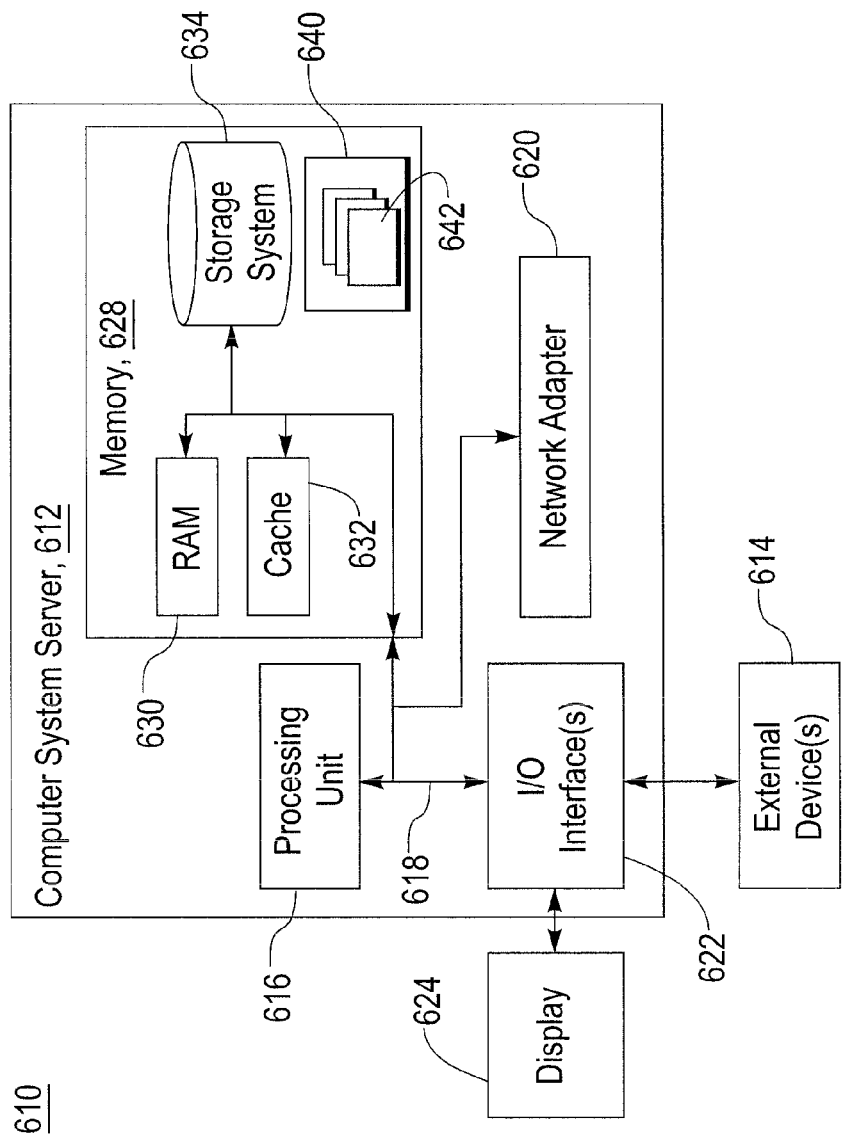
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
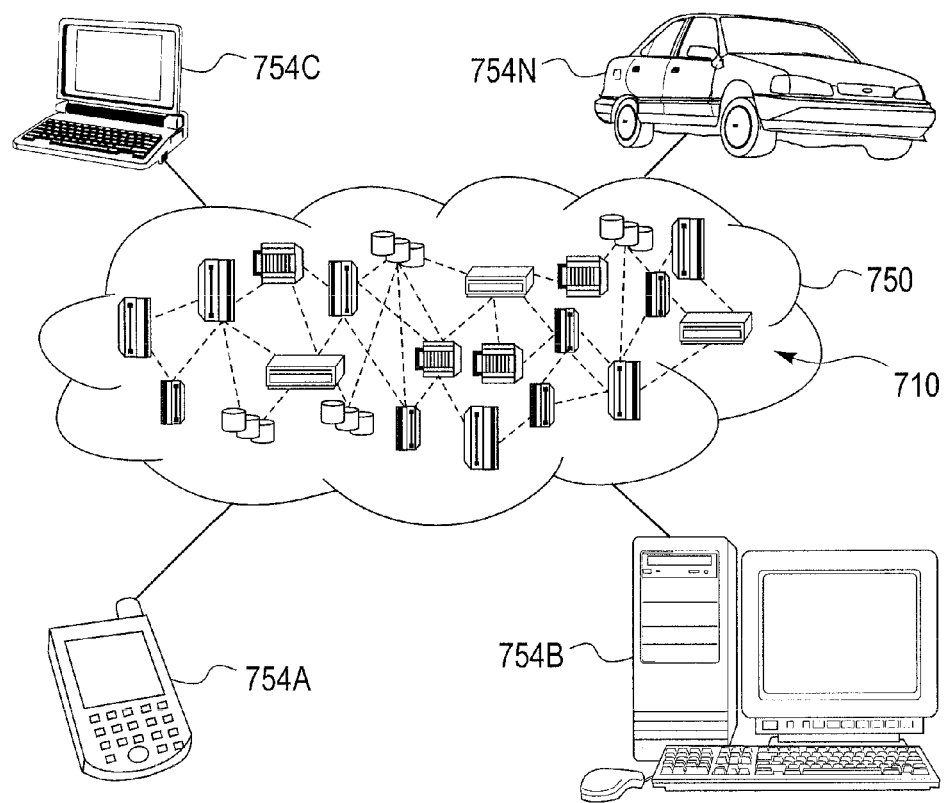
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
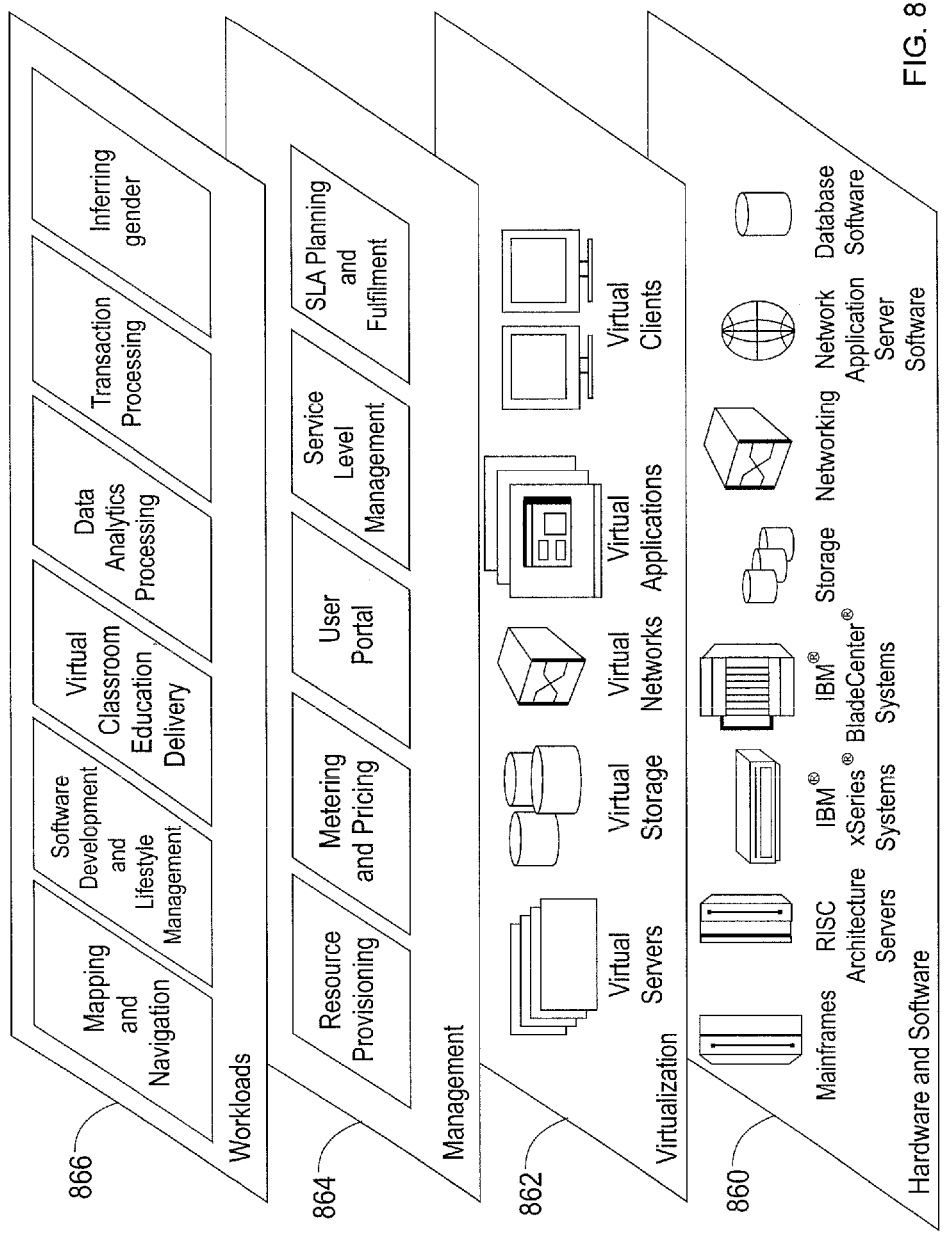
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and inferring gender.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of" for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
a set of visual and textual classifiers for recognizing semantic concepts in a set of images and assigning semantic scores for the images to predict a gender of a user, and performing gender prediction from visual content and textual content in the images to respectively generate visual-based gender predictions and textual-based gender predictions; and
a multimodal information fusion device for combining, using multimodal information fusion, the visual-based gender predictions, the textual-based gender predictions, and the semantic scores to infer a gender of a user.

2. The system of claim 1, wherein the semantic concepts comprise visual-based semantic concepts and textual-based semantic concepts.

3. The system of claim 1, wherein at least one of the visual classifiers and at least one of the textual classifiers generate semantic distributions from the semantic scores, and wherein some of the visual-based gender predictions and the textual-based gender predictions are determined from the semantic distributions.

4. The system of claim 1, wherein at least one of the visual classifiers and at least one of the textual classifiers generate semantic distributions from the semantic scores, wherein some of the visual-based gender predictions and the textual-based gender predictions are determined from aggregations of the semantic distributions.

5. The system of claim 1, wherein said multimodal information fusion device performs filtered fusion by selecting which multimodal gender information to use directly and which of the multimodal gender information to aggregate, to infer the gender of the user, from among the visual-based gender predictions, the textual-based gender predictions, and the semantic scores.

6. The system of claim 1, wherein said multimodal information fusion device further comprises a confidence checker for performing confidence checking on at least some of the semantic scores to influence an inference of the gender of the user.

7. The system of claim 6, wherein the confidence checking is performed separately by a first confidence check on the at least some of the semantic scores relating to the visual content and by a second confidence check on the at least some of the semantic scores relating to the textual content, and the inference of the gender of the user is influenced differently based on an agreement or a non-agreement between the first and the second confidence checks.

8. The system of claim 1, wherein the visual content comprises profile colors and a background scene in a profile picture of the user.

9. A system for inferring gender, comprising:
a set of visual classifiers, each for recognizing visual content from a set of images associated with a user, assigning respective visual-based prediction confidence scores for each of the images based the recognized visual-based content, and at least one for generating a visual-based gender prediction of the user based on the respective visual-based prediction confidence scores for each of the images;
a set of textual classifiers, each for recognizing textual content from the set of images, assigning respective textual-based prediction confidence scores for each of the images based the recognized textual content, and at least one for generating a visual-based gender prediction of the user based on the respective visual-based prediction confidence scores for each of the images; and
a multimodal information fusion device for inferring a gender of a user selectively from the visual-based gender predictions, the textual-based gender predictions, the visual-based prediction confidence scores and the textual-based prediction confidence scores.

10. The system of claim 9, wherein the at least one of the visual classifiers determines respective semantic distributions across the set of images for different ones of the recognized visual content, each of the respective semantic distribution based on an aggregation of the respective visual-based prediction confidence scores for a same one of the recognized visual content for each of the images.

11. The system of claim 9, wherein the at least one of the visual classifiers generates the visual-based gender prediction based on the respective semantic distributions.

* * * * *